United States Patent
Gao et al.

(10) Patent No.: US 11,919,177 B1
(45) Date of Patent: Mar. 5, 2024

(54) TRACKING MEASUREMENT METHOD, APPARATUS AND DEVICE FOR POSE OF TAIL END OF MANIPULATOR

(71) Applicant: GUANGDONG UNIVERSITY OF TECHNOLOGY, Guangzhou (CN)

(72) Inventors: Jian Gao, Guangzhou (CN); Zhenyu Zheng, Guangzhou (CN); Zhuojun Zheng, Guangzhou (CN); Lanyu Zhang, Guangzhou (CN); Yuheng Luo, Guangzhou (CN); Haixiang Deng, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/482,887

(22) Filed: Oct. 8, 2023

(30) Foreign Application Priority Data

Apr. 3, 2023 (CN) .......................... 202310345993.5

(51) Int. Cl.
   *B25J 9/16* (2006.01)
(52) U.S. Cl.
   CPC ........... *B25J 9/1694* (2013.01); *B25J 9/1697* (2013.01)
(58) Field of Classification Search
   None
   See application file for complete search history.

(56) References Cited

U.S. PATENT DOCUMENTS

| | | | | |
|---|---|---|---|---|
| 6,594,600 | B1* | 7/2003 | Arnoul | G06T 7/85 702/94 |
| 9,193,073 | B1* | 11/2015 | Huang | B25J 9/1692 |
| 2020/0023521 | A1* | 1/2020 | Dan | B25J 9/1692 |
| 2022/0331970 | A1* | 10/2022 | Oba | B25J 9/1697 |
| 2023/0070281 | A1* | 3/2023 | Melrose | B25J 9/1697 |

FOREIGN PATENT DOCUMENTS

| | | |
|---|---|---|
| CN | 101750012 A | 6/2010 |
| CN | 111735479 A | 10/2020 |
| CN | 112000135 A | 11/2020 |
| CN | 112132894 A | 12/2020 |
| CN | 114494362 A | 5/2022 |
| JP | 2004309318 A | 11/2004 |
| JP | 2015001465 A | 1/2015 |
| KR | 20020014573 A | 2/2002 |

* cited by examiner

*Primary Examiner* — Ryan Rink (57) ABSTRACT

A tracking measurement method, apparatus and device for a pose of a tail end of a manipulator. The method comprises: shooting a first calibration board mounted at the tail end of the manipulator by a monocular measurement camera, acquiring multiple sets of first transformation matrices, and mounting the monocular measurement camera on a pitch axis of a pan-tilt; shooting a second calibration board by a global camera, and acquiring multiple sets of second transformation matrices; when a calibration center of the first calibration board is in a center of a field of view of the monocular measurement camera, calculating a measured pose of the tail end of the manipulator; and when the calibration center of the first calibration board deviates from the center of the field of view of the monocular measurement camera, calculating a direction deviation angle, and adjusting the pitch axis and a horizontal axis of the pan-tilt.

10 Claims, 5 Drawing Sheets

TRACKING MEASUREMENT METHOD, APPARATUS AND DEVICE FOR POSE OF TAIL END OF MANIPULATOR

CROSS REFERENCE TO RELATED APPLICATIONS

This application claims foreign priority of Chinese Patent Application No. 202310345993.5, filed on Apr. 3, 2023 in the China National Intellectual Property Administration, the disclosures of all of which are hereby incorporated by reference.

TECHNICAL FIELD

The present application relates to the field of robot vision technologies, and particularly to a tracking measurement method, apparatus and device for a pose of a tail end of a manipulator.

BACKGROUND OF THE PRESENT INVENTION

A manipulator is a highly automated mechanical apparatus, which can receive an instruction from a control cabinet and make a tail end accurately reach a certain point in space to work, thus being widely used in different industrial production fields, comprising aerospace, industrial manufacturing, logistics transportation and the like. However, in a process of actual machining and application, the manipulator has the problem of low absolute positioning accuracy, so that an actually machined pose of the tail end deviates from a preset pose of the tail end, resulting in low machining accuracy. Therefore, it is particularly necessary to measure a pose of the tail end of the manipulator.

A multi-degree-of-freedom pose of the tail end of the manipulator is mostly measured by a laser tracker, but this instrument has a high measurement cost and needs to be operated by professionals. In addition, the measurement will fail when measuring light is blocked. Moreover, laser itself is influenced by environmental factors such as an atmospheric temperature, a pressure and a humidity, thus being limited in use. Nowadays, more and more researchers use a visual measurement method, which has the advantages of high measurement accuracy, low device cost, simple operation, no influence from external environmental factors and wide application scenes. Vision-based measurement methods may also be divided into monocular measurement and multiocular measurement. Compared with the multiocular measurement, the monocular measurement has the advantages of convenient use, low hardware cost, simultaneous measurement of position and pose of a target to be measured without complicated epipolar geometry constraint solution, and convenient multi-factor fusion measurement. However, the traditional monocular visual measurement method can only be used to measure a target in a fixed range, and a field of view of the measurement is greatly limited. Therefore, it is difficult to realize the tracking measurement of the pose of the tail end of the manipulator moving in a large range.

SUMMARY OF PRESENT INVENTION

The present application provides a tracking measurement method, apparatus and device for a pose of a tail end of a manipulator for solving the technical problems of a small measurement range and a difficulty of realizing large-range tracking measurement of the pose of the tail end of the manipulator in an existing monocular vision measurement method.

In view of this, a first aspect of the present application provides a tracking measurement method for a pose of a tail end of a manipulator, which comprises the following steps of:

shooting a first calibration board mounted at the tail end of the manipulator by a monocular measurement camera, acquiring multiple sets of first transformation matrices, and mounting the monocular measurement camera on a pitch axis of a pan-tilt;

shooting a second calibration board mounted on the monocular measurement camera by a global camera, and acquiring multiple sets of second transformation matrices;

when a calibration center of the first calibration board is in a center of a field of view of the monocular measurement camera, calculating a measured pose of the tail end of the manipulator based on the first transformation matrix and the second transformation matrix; and when the calibration center of the first calibration board deviates from the center of the field of view of the monocular measurement camera, calculating a direction deviation angle based on the calibration center and the center of the field of view, and adjusting the pitch axis and a horizontal axis of the pan-tilt based on the direction deviation angle.

Preferably, before the step of shooting the first calibration board mounted at the tail end of the manipulator by the monocular measurement camera, acquiring the multiple sets of first transformation matrices, and mounting the monocular measurement camera on the pitch axis of the pan-tilt, the method further comprises the following step of:

calibrating the monocular measurement camera and the global camera according to the first calibration board to obtain a monocular camera intrinsic matrix and a global camera intrinsic matrix.

Preferably, the step of when the calibration center of the first calibration board is in the center of the field of view of the monocular measurement camera, calculating the measured pose of the tail end of the manipulator based on the first transformation matrix and the second transformation matrix, comprises the following steps of:

when the calibration center of the first calibration board is in the center of the field of view of the monocular measurement camera, establishing a pose relation equation based on the first transformation matrix and the second transformation matrix;

solving the pose relation equation according to a quaternion algorithm to obtain a third transformation matrix of the monocular measurement camera relative to the second calibration board; and calculating the measured pose of the tail end of the manipulator according to the first transformation matrix, the second transformation matrix and the third transformation matrix.

Preferably, after the step of when the calibration center of the first calibration board is in the center of the field of view of the monocular measurement camera, calculating the measured pose of the tail end of the manipulator based on the first transformation matrix and the second transformation matrix, the method further comprises the following steps of:

making a difference between the measured pose and an actual pose to obtain a pose deviation; and performing pose compensation adjustment on the manipulator according to the pose deviation.

Preferably, the step of when the calibration center of the first calibration board deviates from the center of the field of view of the monocular measurement camera, calculating the direction deviation angle based on the calibration center and the center of the field of view, and adjusting the pitch axis and the horizontal axis of the pan-tilt based on the direction deviation angle, comprises the following steps of:

when the calibration center of the first calibration board deviates from the center of the field of view of the monocular measurement camera, calculating difference values in an X direction and a Y direction respectively according to the calibration center and the center of the field of view; and calculating direction deviation angles of rotation of the horizontal axis of the pan-tilt and the pitch axis of the pan-tilt respectively based on the difference values, and adjusting the pitch axis and the horizontal axis of the pan-tilt based on the direction deviation angles.

A second aspect of the present application provides a tracking measurement apparatus for a pose of a tail end of a manipulator, which comprises:

a first acquisition unit configured for shooting a first calibration board mounted at the tail end of the manipulator by a monocular measurement camera, acquiring multiple sets of first transformation matrices, and mounting the monocular measurement camera on a pitch axis of a pan-tilt;

a second acquisition unit configured for shooting a second calibration board mounted on the monocular measurement camera by a global camera, and acquiring multiple sets of second transformation matrices;

a pose calculation unit configured for, when a calibration center of the first calibration board is in a center of a field of view of the monocular measurement camera, calculating a measured pose of the tail end of the manipulator based on the first transformation matrix and the second transformation matrix; and a tracking positioning unit configured for, when the calibration center of the first calibration board deviates from the center of the field of view of the monocular measurement camera, calculating a direction deviation angle based on the calibration center and the center of the field of view, and adjusting the pitch axis and a horizontal axis of the pan-tilt based on the direction deviation angle.

Optionally, the apparatus further comprises:

a camera calibration unit configured for calibrating the monocular measurement camera and the global camera according to the first calibration board to obtain a monocular camera intrinsic matrix and a global camera intrinsic matrix.

Preferably, the pose calculation unit comprises:

an equation establishment subunit configured for, when the calibration center of the first calibration board is in the center of the field of view of the monocular measurement camera, establishing a pose relation equation based on the first transformation matrix and the second transformation matrix;

an equation solution subunit configured for solving the pose relation equation according to a quaternion algorithm to obtain a third transformation matrix of the monocular measurement camera relative to the second calibration board; and a pose calculation subunit configured for calculating the measured pose of the tail end of the manipulator according to the first transformation matrix, the second transformation matrix and the third transformation matrix.

Preferably, the tracking positioning unit is specifically configured for:

when the calibration center of the first calibration board deviates from the center of the field of view of the monocular measurement camera, calculating difference values in an X direction and a Y direction respectively according to the calibration center and the center of the field of view; and calculating direction deviation angles of rotation of the horizontal axis of the pan-tilt and the pitch axis of the pan-tilt respectively based on the difference values, and adjusting the pitch axis and the horizontal axis of the pan-tilt based on the direction deviation angles.

A third aspect of the present application provides a tracking measurement device for a pose of a tail end of a manipulator, wherein the device comprises a processor and a storage;

the storage is configured for storing a program code and transmitting the program code to the processor; and the processor is configured for executing the tracking measurement method for the pose of the tail end of the manipulator in the first aspect according to an instruction in the program code.

It can be seen from the technical solution above that the embodiments of present application have the following advantages:

in the present application, the tracking measurement method for the pose of the tail end of the manipulator is provided, which comprises the following steps of: shooting the first calibration board mounted at the tail end of the manipulator by the monocular measurement camera, acquiring the multiple sets of first transformation matrices, and mounting the monocular measurement camera on the pitch axis of the pan-tilt; shooting the second calibration board mounted on the monocular measurement camera by the global camera, and acquiring the multiple sets of second transformation matrices; when the calibration center of the first calibration board is in the center of the field of view of the monocular measurement camera, calculating the measured pose of the tail end of the manipulator based on the first transformation matrix and the second transformation matrix; and when the calibration center of the first calibration board deviates from the center of the field of view of the monocular measurement camera, calculating the direction deviation angle based on the calibration center and the center of the field of view, and adjusting the pitch axis and the horizontal axis of the pan-tilt based on the direction deviation angle.

According to the tracking measurement method for the pose of the tail end of the manipulator provided by the present application, the pan-tilt is introduced to build a two-degree-of-freedom visual measurement environment, thus expanding a measurement range of a camera; meanwhile, in order to unify coordinates of the pose of the tail end of the manipulator in different coordinate systems, the global camera is added to shoot and measure the monocular measurement camera; in a process of self-measurement of the pose, if the tail end of the manipulator deviates from a center of the camera, a motion of the pitch axis of the pan-tilt is calculated and adjusted through the center deviation, and if the tail end of the manipulator is in the center of the camera, the accurate measured pose is calculated according to the transformation matrix; and tracking accuracy can also be ensured under a condition of expanding the measurement range. Therefore, the present application can solve the technical problems of a small measurement range and a difficulty of realizing large-range tracking measurement of the pose of the tail end of the manipulator in an existing monocular vision measurement method.

DETAILED DESCRIPTION OF PREFERRED EMBODIMENTS

In order to make those skilled in the art better understand the solution of the present application, the technical solution in the embodiments of the present application is clearly and completely described with reference to the drawings in the embodiments of the present application. Apparently, the described embodiments are merely some but not all of the embodiments of the present application. Based on the embodiments of the present application, all other embodiments obtained by those of ordinary skills in the art without going through any creative work should fall within the scope of protection of the present application.

Figure 1:
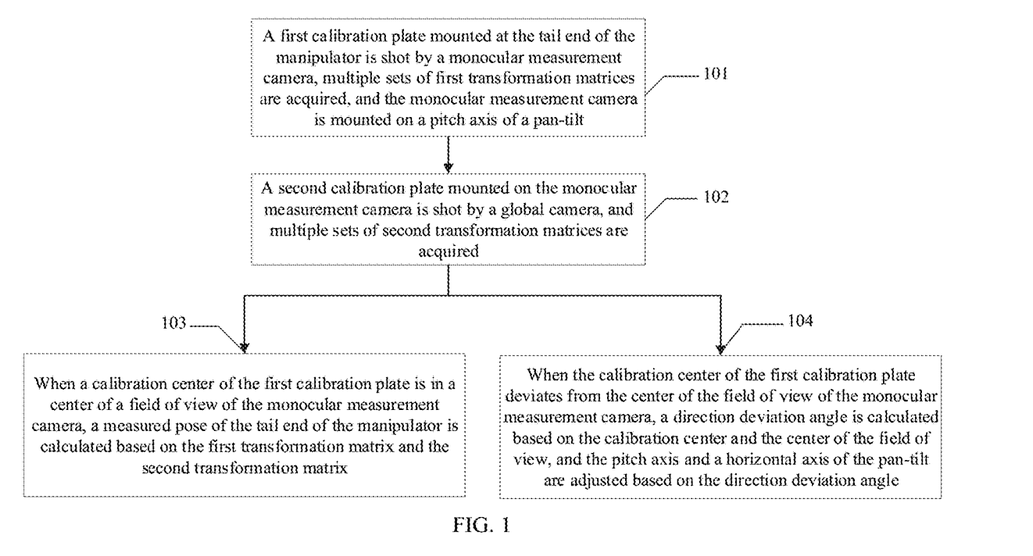
FIG. 1 is a flow chart of a tracking measurement method for a pose of a tail end of a manipulator provided by an embodiment of the present application.

For easy understanding, with reference to FIG. 1, First Embodiment of a tracking measurement method for a pose of a tail end of a manipulator provided by the present application comprises the following steps.

In step 101, a first calibration board mounted at the tail end of the manipulator is shot by a monocular measurement camera, multiple sets of first transformation matrices are acquired, and the monocular measurement camera is mounted on a pitch axis of a pan-tilt.

In step 102, a second calibration board mounted on the monocular measurement camera is shot by a global camera, and multiple sets of second transformation matrices are acquired.

The first calibration board is mounted at the tail end of the manipulator, and the monocular measurement camera tracks and positions the pose of the tail end of the manipulator by shooting the first calibration board. The monocular measurement camera is mounted on the pitch axis of the pan-tilt, which can expand a shooting range of the monocular measurement camera. In order to avoid the problem of non-uniform coordinates caused by introduction of the pan-tilt, the global camera is added in the embodiment, the global camera is mounted above the monocular measurement camera, and it is ensured that the global camera may observe the second calibration board mounted on the monocular measurement camera.

A transformation matrix of the first calibration board relative to the monocular measurement camera may be acquired by shooting the first calibration board by the monocular measurement camera, which is called a first transformation matrix C; while a transformation matrix of the second calibration board relative to the global camera may be acquired by shooting the second calibration board by the global camera, which is called a second transformation matrix D.

By changing a pose of the first calibration board at the tail end of the manipulator for many times, multiple sets of corresponding first transformation matrices and second transformation matrices may be acquired by the monocular measurement camera and the global camera respectively. It can be understood that there is a corresponding relationship between the first transformation matrix and the second transformation matrix obtained by each shooting, which is namely the transformation matrix obtained by the monocular measurement camera. Correspondingly, the global camera may shoot the second calibration board on the monocular measurement camera to obtain a corresponding transformation matrix.

In step 103, when a calibration center of the first calibration board is in a center of a field of view of the monocular measurement camera, a measured pose of the tail end of the manipulator is calculated based on the first transformation matrix and the second transformation matrix.

The calibration center is a center of the calibration board, and mainly refers to a center of the first calibration board in the embodiment. The center of the field of view is a central area of the monocular measurement camera, and camera parameters and central area parameters may be determined in advance for each camera. If the calibration center of the first calibration board is in the center of the field of view of the monocular measurement camera, the pose of the tail end of the manipulator may be directly positioned and calculated, based on the first transformation matrix and the second transformation matrix. In the embodiment, the calculation may be expressed as:

$$C_2^{-1}C_1X = XD_2^{-1}D_1;$$

wherein, X represents a relative transformation matrix between the monocular measurement camera and the second calibration board, while a relationship between the global camera and the first calibration board is fixed, so that on this basis, the pose of the first calibration board at the tail end of the manipulator, which is determined by a global coordinate system of the global camera, may be further obtained, which is namely CXD.

In step 104, when the calibration center of the first calibration board deviates from the center of the field of view of the monocular measurement camera, a direction deviation angle is calculated based on the calibration center and the center of the field of view, and the pitch axis and a horizontal axis of the pan-tilt are adjusted based on the direction deviation angle.

When the calibration center is not in the center of the field of view, it is indicated that the tail end of the manipulator has deviated from a detection area of the monocular measurement camera, so that it is necessary to calculate the direction deviation angle and adjust the pitch axis and the horizontal axis of the pan-tilt based on the deviation angle. The direction deviation angle is calculated based on the calibration center of the first calibration board and the center of the field of view of the monocular measurement camera. The camera is mounted on the pitch axis of the pan-tilt, so that two centers may be effectively adjusted to appropriate positions by adjusting the pitch axis and the horizontal axis of the pan-tilt, so as to meet a condition that the calibration center of the first calibration board above is in the center of the field of view of the monocular measurement camera, thus tracking and measuring the pose of the tail end of the manipulator.

According to the tracking measurement method for the pose of the tail end of the manipulator provided by the embodiment of the present application, the pan-tilt is introduced to build a two-degree-of-freedom visual measurement environment, thus expanding a measurement range of a camera; meanwhile, in order to unify coordinates of the pose of the tail end of the manipulator in different coordinate systems, the global camera is added to shoot and measure the monocular measurement camera; in a process of measurement of the pose, if the tail end of the manipulator deviates from a center of the camera, motions of the pitch axis and the horizontal axis of the pan-tilt are calculated and adjusted through the center deviation, and if the tail end of the manipulator is in the center of the camera, the accurate measured pose is calculated according to the transformation matrix; and tracking accuracy can also be ensured under a condition of expanding the measurement range. Therefore, the embodiment of the present application can solve the technical problems of a small measurement range and a difficulty of realizing large-range tracking measurement of the pose of the tail end of the manipulator in an existing monocular vision measurement method.

Figure 2:
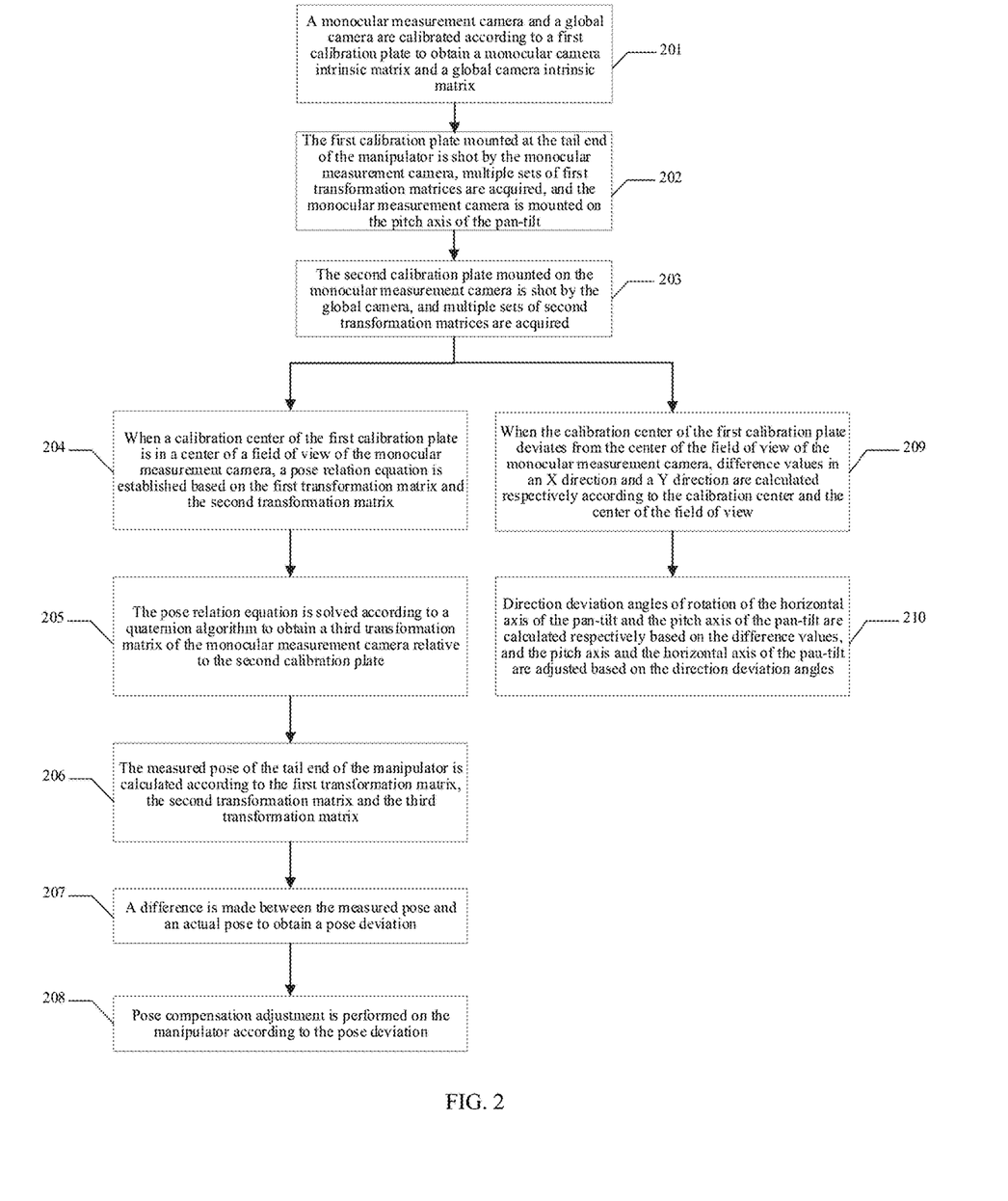
FIG. 2 is another flow chart of the tracking measurement method for the pose of the tail end of the manipulator provided by the embodiment of the present application.

For easy understanding, with reference to FIG. 2, Second Embodiment of the tracking measurement method for the pose of the tail end of the manipulator provided by the present application comprises the following steps.

In step 201, a monocular measurement camera and a global camera are calibrated according to a first calibration board to obtain a monocular camera intrinsic matrix and a global camera intrinsic matrix.

The intrinsic matrix may be expressed as:

$$\begin{bmatrix} fx & 0 & u0 \\ 0 & fy & v0 \\ 0 & 0 & 1 \end{bmatrix};$$

wherein, fx represents a number of pixels occupied by a focal length f of the camera in an x-axis direction of a camera internal image coordinate system, which is also called a normalized focal length in the x-axis direction, in a unit of pixel; fy represents a number of pixels occupied by a focal length f of the camera in a y-axis direction of the camera internal image coordinate system, which is also called a normalized focal length in the y-axis direction, in a unit of pixel; and $(u_o, v_o)$ represent an origin of the camera internal image coordinate system, which is namely an intersection of a camera optical axis and a camera imaging plane, in a unit of pixel.

Because the embodiment involves the monocular measurement camera, the global camera, the first calibration board, a second calibration board and a pan-tilt, it is necessary to calibrate the two cameras in advance to acquire camera intrinsics, which are namely the monocular camera intrinsic matrix and the global camera intrinsic matrix. In a subsequent process of acquiring a relative coordinate transformation matrix, the acquired parameters related to the camera may be used freely, which will not be discussed one by one hereinafter.

In step 202, the first calibration board mounted at the tail end of the manipulator is shot by the monocular measurement camera, multiple sets of first transformation matrices are acquired, and the monocular measurement camera is mounted on the pitch axis of the pan-tilt.

In step 203, the second calibration board mounted on the monocular measurement camera is shot by the global camera, and multiple sets of second transformation matrices are acquired.

Figure 4:
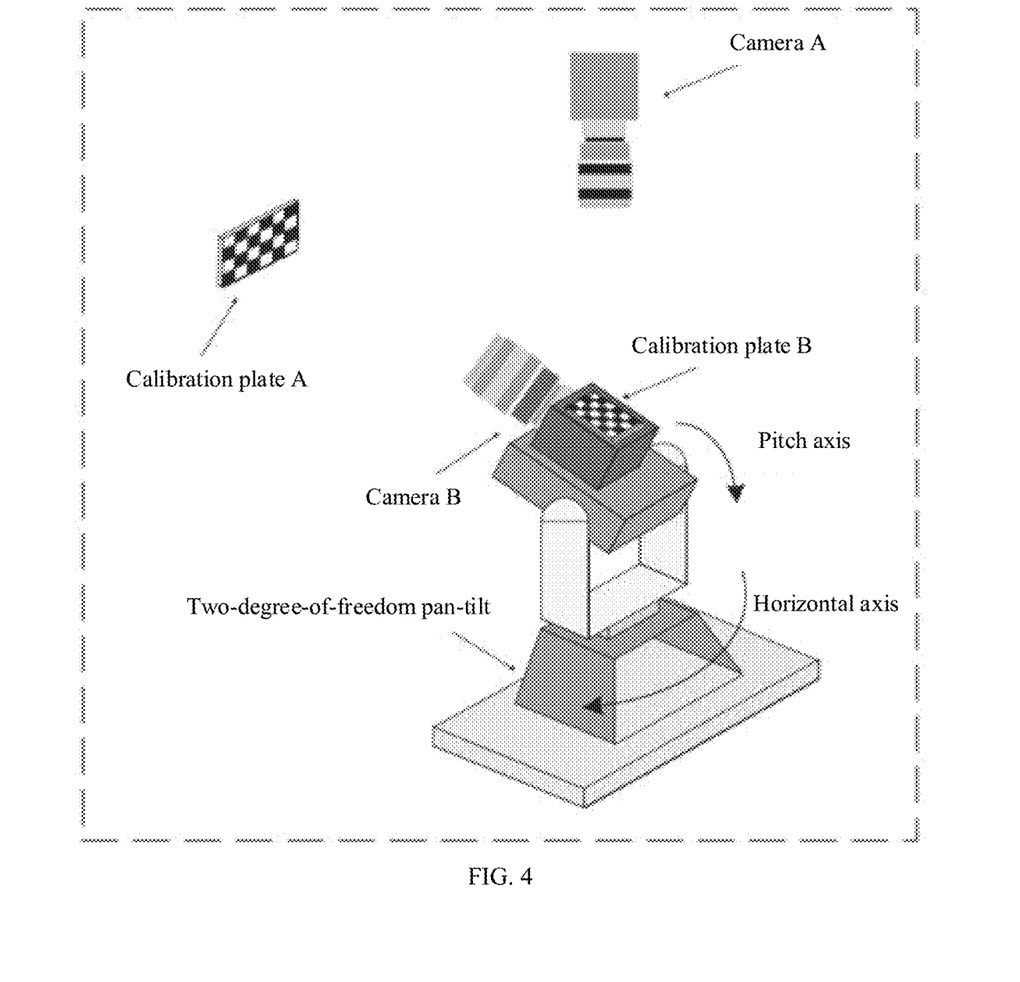
FIG. 4 is a first schematic diagram of a mounting structure of a tracking measurement device for a pose of a tail end of a manipulator provided by the embodiment of the present application.
Figure 5:
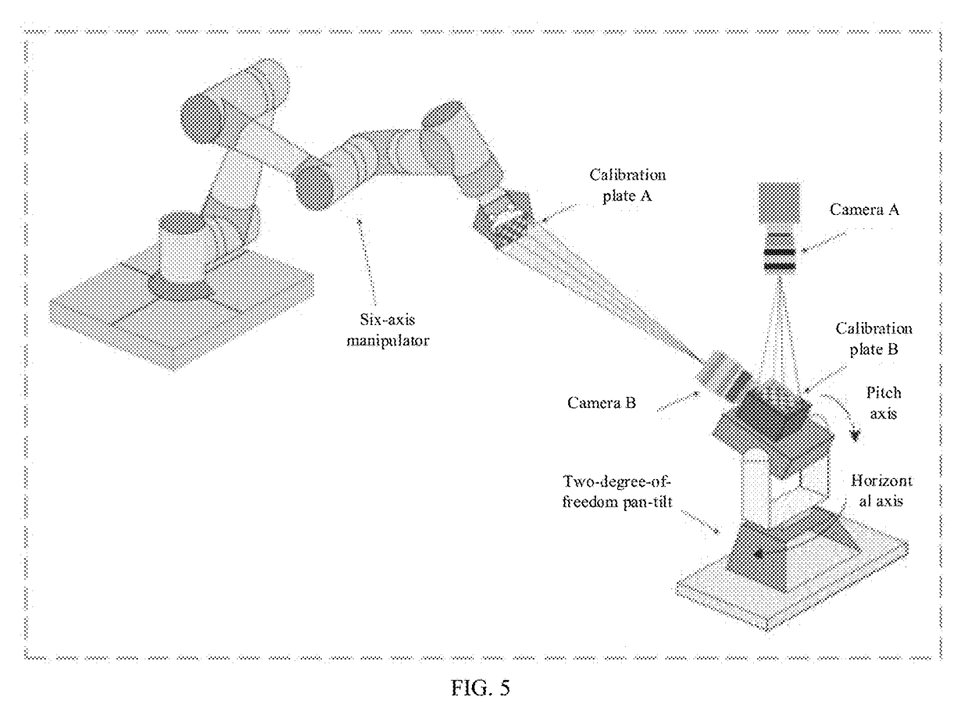
FIG. 5 is a second schematic diagram of the mounting structure of the tracking measurement device for the pose of the tail end of the manipulator provided by the embodiment of the present application.

With reference to FIG. 4 and FIG. 5, the global camera is a camera A, the monocular measurement camera is a camera B, the first calibration board is a calibration board A, the second calibration board is a calibration board B, and the pan-tilt is a two-degree-of-freedom pan-tilt. The global camera is mounted above the monocular measurement camera for observing the monocular measurement camera. The monocular measurement camera is mounted on the pitch axis of the pan-tilt for shooting the first calibration board at the tail end of the manipulator. A transformation matrix of the first calibration board relative to the monocular measurement camera may be acquired by shooting the first calibration board by the monocular measurement camera, which is called a first transformation matrix C; while a transformation matrix of the second calibration board relative to the global camera may be acquired by shooting the second calibration board by the global camera, which is called a second transformation matrix D. Specifically, the first transformation matrix C and the second transformation matrix D are expressed as:

$$C = \begin{bmatrix} R_{camB}^{calA} & T_{camB}^{calA} \\ 0 & 1 \end{bmatrix}$$

$$D = \begin{bmatrix} R_{camB}^{calB} & T_{camA}^{calB} \\ 0 & 1 \end{bmatrix};$$

wherein, $R_{camB}^{calA}$ and $T_{camB}^{calA}$ are matrices of 3×3 and 3×1 respectively, and represent a rotation transformation matrix and a translation transformation matrix of the first calibration board relative to the monocular measurement camera respectively; and $R_{camA}^{calB}$ and $T_{camA}^{calB}$ are matrices of 3×3 and 3×1 respectively, and represent a rotation transformation matrix and a translation transformation matrix of the second calibration board relative to the global camera respectively. Moreover, the first transformation matrix C and the second transformation matrix D are both a matrix of 4×4.

By changing a pose of the first calibration board at the tail end of the manipulator for many times, multiple sets of corresponding first transformation matrices C and second transformation matrices D may be acquired by the monocular measurement camera and the global camera respectively. It can be understood that there is a corresponding relationship between the first transformation matrix C and the second transformation matrix D obtained by each shooting, which is namely the transformation matrix obtained by the monocular measurement camera. Correspondingly, the global camera may shoot the second calibration board on the monocular measurement camera to obtain a corresponding transformation matrix.

In step 204, when a calibration center of the first calibration board is in a center of a field of view of the monocular measurement camera, a pose relation equation is established based on the first transformation matrix and the second transformation matrix.

In step 205, the pose relation equation is solved according to a quaternion algorithm to obtain a third transformation matrix of the monocular measurement camera relative to the second calibration board.

In step 206, the measured pose of the tail end of the manipulator is calculated according to the first transformation matrix, the second transformation matrix and the third transformation matrix.

If the calibration center of the first calibration board is in the center of the field of view of the monocular measurement camera, the pose of the tail end of the manipulator may be directly positioned and calculated, based on the first transformation matrix and the second transformation matrix. Because a relative relationship between the first calibration board and the global camera is fixed, $C_2^{-1}C_1X=XD_2^{-1}D_1$ is established two adjacent poses. In the embodiment, multiple sets of transformation matrices are acquired, so that a pose relation equation set may be established:

$$\begin{cases} C_2^{-1}C_1X = XD_2^{-1}D_1 \\ C_3^{-1}C_2X = XD_3^{-1}D_2 \\ \vdots \\ C_N^{-1}C_{N-1}X = XD_N^{-1}D_{N-1} \end{cases};$$

wherein, N is a number of changed poses of the first calibration board at the tail end of the manipulator, and then the equation set is solved by the quaternion algorithm, so that the transformation matrix X of the monocular measurement camera relative to the second calibration board may be obtained, which is namely the third transformation matrix:

$$X = \begin{bmatrix} R_{calB}^{camB} & T_{calB}^{camB} \\ 0 & 1 \end{bmatrix};$$

wherein, $R_{camB}^{calB}$ and $T_{camB}^{calB}$ are matrices of 3×3 and 3×1 respectively, and represent a rotation transformation matrix and a translation transformation matrix of the monocular measurement camera relative to the second calibration board respectively, and the third transformation matrix X is a matrix of 4×4. Therefore, the pose of the first calibration board at the tail end of the manipulator may be determined by a global coordinate system of the global camera, and expressed as CXD, which is namely the measured pose of the tail end of the manipulator:

$$M =$$

$$CXD = \begin{bmatrix} R_{camB}^{calA} & T_{camB}^{calA} \\ 0 & 1 \end{bmatrix}\begin{bmatrix} R_{calB}^{camB} & T_{calB}^{camB} \\ 0 & 1 \end{bmatrix}\begin{bmatrix} R_{camA}^{calB} & T_{camA}^{calB} \\ 0 & 1 \end{bmatrix} = \begin{bmatrix} R_{camA}^{calA} & T_{camA}^{calA} \\ 0 & 1 \end{bmatrix};$$

wherein, M is a matrix of 4×4, and $R_{camA}^{calA}$ and $T_{camA}^{calA}$ are matrices of 3×3 and 3×1 respectively, and represent a rotation transformation matrix and a translation transformation matrix of the first calibration board relative to the global camera respectively.

In step 207, a difference is made between the measured pose and an actual pose to obtain a pose deviation.

In step 208, pose compensation adjustment is performed on the manipulator according to the pose deviation.

If the CXD measured in the embodiment is a predicted pose, but $C_2XD_2$ is measured in an actual working process, then the pose deviation may be calculated: $C_2XD_2-CXD$. The specific pose deviation may be expressed as:

$$\Delta M = \begin{bmatrix} \Delta R & \Delta T \\ 0 & 1 \end{bmatrix};$$

wherein, ΔM is a matrix of 4×4, and ΔR and ΔI are matrices of 3×3 and 3×1 respectively, and represent a rotation deviation matrix and a translation deviation matrix of a preset pose of the tail end of the manipulator relative to an actual working pose respectively. The manipulator may be controlled to perform corresponding pose compensation adjustment according to the calculated pose deviation, so that the preset pose, which is namely the predicted pose, may be accurately achieved, thus accurately completing an action of the manipulator.

In step 209, when the calibration center of the first calibration board deviates from the center of the field of view of the monocular measurement camera, difference values in an X direction and a Y direction are calculated respectively according to the calibration center and the center of the field of view.

In step 210, direction deviation angles of rotation of the horizontal axis of the pan-tilt and the pitch axis of the pan-tilt are calculated respectively based on the difference values, and the pitch axis and the horizontal axis of the pan-tilt are adjusted based on the direction deviation angles.

When the calibration center is not in the center of the field of view, it is indicated that the tail end of the manipulator has deviated from a detection area of the monocular measurement camera, so that it is necessary to calculate the direction deviation angle and adjust the pitch axis and the horizontal axis of the pan-tilt based on the deviation angle. Firstly, the difference values in the X direction and the Y direction between the calibration center and the center of the field of view need to be obtained, and then the direction deviation angles of rotation needed by the horizontal axis and the pitch axis of the pan-tilt are calculated according to the difference values, which are respectively expressed as $\theta_{SF}$ and $\theta_{FF}$. If coordinates of the center of the first calibration board in a pixel coordinate system of the monocular measurement camera are (x, y), coordinates of a center of the pixel coordinate system are $(u_o, v_o)$, and the intrinsics of the monocular measurement camera are known, then it can be known that an angle of rotation needed by a horizontal steering engine to reposition the first calibration board in the center of the field of view of the monocular measurement camera should be:

$$\theta_{SP} = \mathrm{ac\,tan}\left(\frac{x-u_0}{f_x}\right);$$

an angle of rotation needed by a pitch-axis steering engine should is:

$$\theta_{FY} = \mathrm{ac\,tan}\left(\frac{y-y_0}{f_y}\right);$$

and finally, an action of the pan-tilt is adjusted based on the calculated direction deviation angle, so that the monocular measurement camera is always aimed at the tail end of the manipulator, thus playing a role of tracking measurement.

It can be understood that, compared with a contact measurement method such as a three-coordinate machine, the measurement method in the embodiment refers to non-contact measurement, with higher measurement flexibility and better convenience. A laser tracker in which a non-contact measurement method is used has high measurement accuracy, but the laser tracker is high in measurement cost, complicated in operation by professionals, and greatly influenced by external environmental factors. Therefore, compared with the measurement method of the laser tracker, the measurement method in the embodiment is lower in measurement cost, not interfered by external environment, and applicable to a wide range of scenes. Most importantly, in the embodiment, the pan-tilt is used to expand a shooting range of the monocular measurement camera, so that the requirement of a wider measurement range for the pose of the tail end of the manipulator is met. Finally, the pose deviation compensation of the tail end of the manipulator can also reduce a machining error, thus improving actual machining accuracy.

Figure 3:
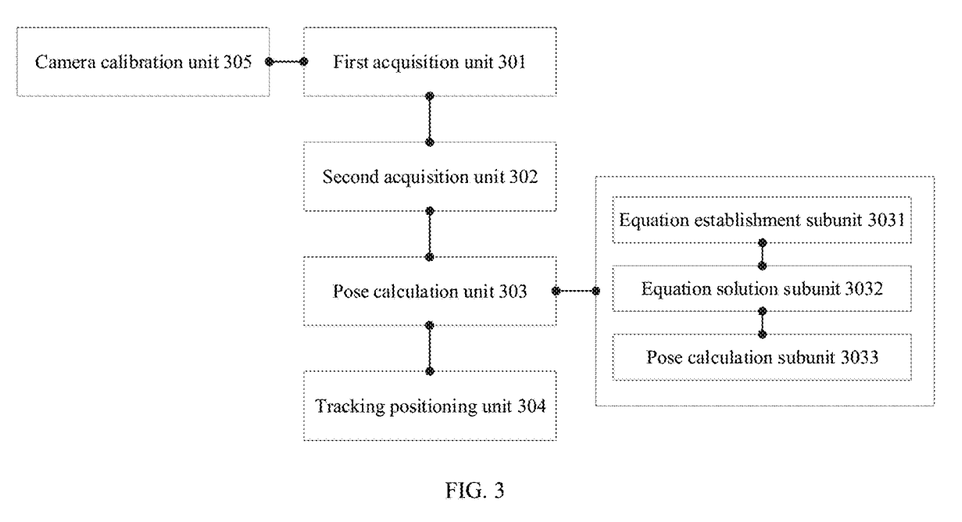
FIG. 3 is a schematic structural diagram of a tracking measurement apparatus for a pose of a tail end of a manipulator provided by the embodiment of the present application.

For easy understanding, with reference to FIG. 3, an embodiment of a tracking measurement apparatus for a pose of a tail end of a manipulator provided by the present application comprises:

first acquisition unit 301 configured for shooting a first calibration board mounted at the tail end of the manipulator by a monocular measurement camera, acquiring multiple sets of first transformation matrices, and mounting the monocular measurement camera on a pitch axis of a pan-tilt;

a second acquisition unit 302 configured for shooting a second calibration board mounted on the monocular measurement camera by a global camera, and acquiring multiple sets of second transformation matrices;

a pose calculation unit 303 configured for, when a calibration center of the first calibration board is in a center of a field of view of the monocular measurement camera, calculating a measured pose of the tail end of the manipulator based on the first transformation matrix and the second transformation matrix; and a tracking positioning unit 304 configured for, when the calibration center of the first calibration board deviates from the center of the field of view of the monocular measurement camera, calculating a direction deviation angle based on the calibration center and the center of the field of view, and adjusting the pitch axis and a horizontal axis of the pan-tilt based on the direction deviation angle.

Further, the apparatus further comprises:

a camera calibration unit 305 configured for calibrating the monocular measurement camera and the global camera according to the first calibration board to obtain a monocular camera intrinsic matrix and a global camera intrinsic matrix.

Further, the pose calculation unit 303 comprises:

an equation establishment subunit 3031 configured for, when the calibration center of the first calibration board is in the center of the field of view of the monocular measurement camera, establishing a pose relation equation based on the first transformation matrix and the second transformation matrix;

an equation solution subunit 3032 configured for solving the pose relation equation according to a quaternion algorithm to obtain a third transformation matrix of the monocular measurement camera relative to the second calibration board; and a pose calculation subunit 3033 configured for calculating the measured pose of the tail end of the manipulator according to the first transformation matrix, the second transformation matrix and the third transformation matrix.

Further, the tracking positioning unit 304 is specifically configured for:

when the calibration center of the first calibration board deviates from the center of the field of view of the monocular measurement camera, calculating difference values in an X direction and a Y direction respectively according to the calibration center and the center of the field of view; and calculating direction deviation angles of rotation of the horizontal axis of the pan-tilt and the pitch axis of the pan-tilt respectively based on the difference values, and adjusting the pitch axis and the horizontal axis of the pan-tilt based on the direction deviation angles.

The present application further provides a tracking measurement device for a pose of a tail end of a manipulator, wherein the device comprises a processor and a storage.

The storage is configured for storing a program code and transmitting the program code to the processor.

The processor is configured for executing the tracking measurement method for the pose of the tail end of the manipulator in the above method embodiment according to an instruction in the program code.

In the several embodiments provided in the present application, it should be understood that the disclosed apparatus and method may be implemented in other ways. For example, the apparatus embodiments described above are only illustrative. For example, the division of the units is only one logical function division. In practice, there may be other division methods. For example, multiple units or components may be combined or integrated into another system, or some features may be ignored or not executed. In addition, the illustrated or discussed mutual coupling or direct coupling or communication connection may be indirect coupling or communication connection through some interfaces, apparatuses or units, and may be in electrical, mechanical or other forms.

The units illustrated as separated parts may be or not be physically separated, and the parts displayed as units may be or not be physical units, which means that the parts may be located in one place or distributed on multiple network units. Some or all of the units may be selected according to actual needs to achieve the objects of the solutions of the embodiments.

In addition, each functional unit in each embodiment of the present application may be integrated in one processing unit, or each unit may exist alone physically, or two or more units may be integrated in one unit. The integrated units above may be implemented in a form of hardware, or may be implemented in a form of software functional unit.

The integrated units, if being implemented in the form of software functional unit and taken as an independent product to sell or use, may also be stored in one computer-readable storage medium. Based on such understanding, the essence of the technical solution of the present application, or a part contributing to the prior art, or all or a part of the technical solution may be embodied in a form of software product. The computer software product is stored in one storage medium including a number of instructions such that a computer device (which may be a personal computer, a server, or a network device, etc.) executes all or a part of steps of the method in the embodiments of the present application. Moreover, the foregoing storage medium comprises: various media capable of storing the program code, such as a USB disk, a mobile hard disk, a Read-Only Memory (ROM), a Random Access Memory (RAM), a magnetic disk or an optical disk.

As described above, the embodiments above are only used to illustrate the technical solution of the present application, and are not intended to limit the present application. Although the present application has been described in detail with reference to the above-mentioned embodiments, those of ordinary skills in the art should understand that: the technical solution recorded in the above-mentioned embodiments can still be modified, or equivalent substitutions can be made to a part of the technical features in the embodiments. However, these modifications or substitutions should not depart from the spirit and scope of the technical solution of the embodiments of the present application.

We claim:

1. A tracking measurement method for a pose of a tail end of a manipulator, comprising the following steps of:
    shooting a first calibration board mounted at the tail end of the manipulator by a monocular measurement camera, acquiring multiple sets of first transformation matrices, and mounting the monocular measurement camera on a pitch axis of a pan-tilt;
    shooting a second calibration board mounted on the monocular measurement camera by a global camera, and acquiring multiple sets of second transformation matrices;
    when a calibration center of the first calibration board is in a center of a field of view of the monocular measurement camera, calculating a measured pose of the tail end of the manipulator based on the first transformation matrix and the second transformation matrix; and
    when the calibration center of the first calibration board deviates from the center of the field of view of the monocular measurement camera, calculating a direction deviation angle based on the calibration center and the center of the field of view, and adjusting the pitch axis and a horizontal axis of the pan-tilt based on the direction deviation angle.

2. The tracking measurement method for the pose of the tail end of the manipulator according to claim 1, wherein before the step of shooting the first calibration board mounted at the tail end of the manipulator by the monocular measurement camera, acquiring the multiple sets of first transformation matrices, and mounting the monocular measurement camera on the pitch axis of the pan-tilt, the method further comprises the following step of:
    calibrating the monocular measurement camera and the global camera according to the first calibration board to obtain a monocular camera intrinsic matrix and a global camera intrinsic matrix.

3. The tracking measurement method for the pose of the tail end of the manipulator according to claim 1, wherein the step of when the calibration center of the first calibration board is in the center of the field of view of the monocular measurement camera, calculating the measured pose of the tail end of the manipulator based on the first transformation matrix and the second transformation matrix, comprises the following steps of:
    when the calibration center of the first calibration board is in the center of the field of view of the monocular measurement camera, establishing a pose relation equation based on the first transformation matrix and the second transformation matrix;
    solving the pose relation equation according to a quaternion algorithm to obtain a third transformation matrix of the monocular measurement camera relative to the second calibration board; and
    calculating the measured pose of the tail end of the manipulator according to the first transformation matrix, the second transformation matrix and the third transformation matrix.

4. The tracking measurement method for the pose of the tail end of the manipulator according to claim 1, wherein after the step of when the calibration center of the first calibration board is in the center of the field of view of the monocular measurement camera, calculating the measured pose of the tail end of the manipulator based on the first transformation matrix and the second transformation matrix, the method further comprises the following steps of:
    making a difference between the measured pose and an actual pose to obtain a pose deviation; and
    performing pose compensation adjustment on the manipulator according to the pose deviation.

5. The tracking measurement method for the pose of the tail end of the manipulator according to claim 1, wherein the step of when the calibration center of the first calibration board deviates from the center of the field of view of the monocular measurement camera, calculating the direction deviation angle based on the calibration center and the center of the field of view, and adjusting the pitch axis and the horizontal axis of the pan-tilt based on the direction deviation angle, comprises the following steps of:
    when the calibration center of the first calibration board deviates from the center of the field of view of the monocular measurement camera, calculating difference values in an X direction and a Y direction respectively according to the calibration center and the center of the field of view; and
    calculating direction deviation angles of rotation of the horizontal axis of the pan-tilt and the pitch axis of the pan-tilt respectively based on the difference values, and adjusting the pitch axis and the horizontal axis of the pan-tilt based on the direction deviation angles.

6. A tracking measurement apparatus for a pose of a tail end of a manipulator, comprising:
    a first acquisition unit, including a monocular measurement camera mounted on a pitch axis of a pan-tilt and a first calibration board mounted at the tail end of the manipulator, the first acquisition unit configured for shooting the first calibration board by the monocular measurement camera, to acquire multiple sets of first transformation matrices;
    a second acquisition unit, including a global camera and a second calibration board mounted on the monocular measurement camera, the second acquisition unit configured for shooting the second calibration board by the global camera, to acquire multiple sets of second transformation matrices; and
    one or more processors, configured for performing units comprising:
    a pose calculation unit configured for, when a calibration center of the first calibration board is in a center of a field of view of the monocular measurement camera, calculating a measured pose of the tail end of the manipulator based on the first transformation matrix and the second transformation matrix; and
    a tracking positioning unit configured for, when the calibration center of the first calibration board deviates from the center of the field of view of the monocular measurement camera, calculating a direction deviation angle based on the calibration center and the center of the field of view, and adjusting the pitch axis and a horizontal axis of the pan-tilt based on the direction deviation angle.

7. The tracking measurement apparatus for the pose of the tail end of the manipulator according to claim 6, the one or more processors further comprising:
a camera calibration unit configured for calibrating the monocular measurement camera and the global camera according to the first calibration board to obtain a monocular camera intrinsic matrix and a global camera intrinsic matrix.

8. The tracking measurement apparatus for the pose of the tail end of the manipulator according to claim 6, wherein the pose calculation unit comprises:
an equation establishment subunit configured for, when the calibration center of the first calibration board is in the center of the field of view of the monocular measurement camera, establishing a pose relation equation based on the first transformation matrix and the second transformation matrix;
an equation solution subunit configured for solving the pose relation equation according to a quaternion algorithm to obtain a third transformation matrix of the monocular measurement camera relative to the second calibration board; and
a pose calculation subunit configured for calculating the measured pose of the tail end of the manipulator according to the first transformation matrix, the second transformation matrix and the third transformation matrix.

9. The tracking measurement apparatus for the pose of the tail end of the manipulator according to claim 6, wherein the tracking positioning unit is configured for:
when the calibration center of the first calibration board deviates from the center of the field of view of the monocular measurement camera, calculating difference values in an X direction and a Y direction respectively according to the calibration center and the center of the field of view; and
calculating direction deviation angles of rotation of the horizontal axis of the pan-tilt and the pitch axis of the pan-tilt respectively based on the difference values, and adjusting the pitch axis and the horizontal axis of the pan-tilt based on the direction deviation angles.

10. A tracking measurement device for a pose of a tail end of a manipulator, wherein the device comprises a processor and a storage;
the storage is configured for storing a program code and transmitting the program code to the processor; and
the processor is configured for executing the tracking measurement method for the pose of the tail end of the manipulator according to claim 1 according to an instruction in the program code.

* * * * *